Dec. 8, 1925.
J. JEUP
ANTISKID ATTACHMENT FOR VEHICLE WHEELS
Filed Feb. 9, 1924
1,565,095
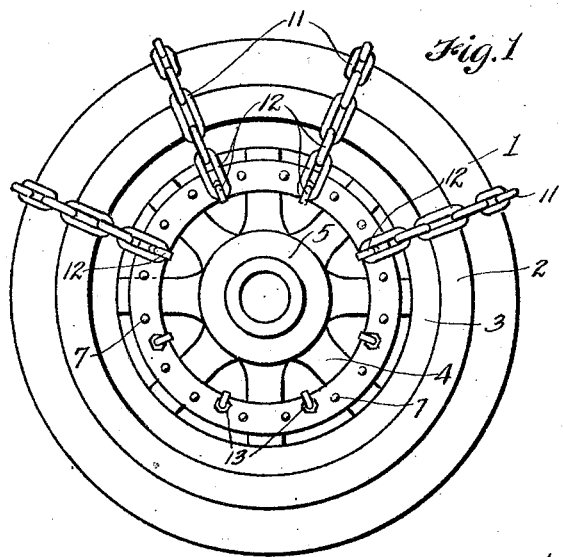
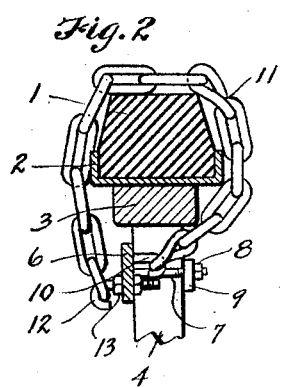
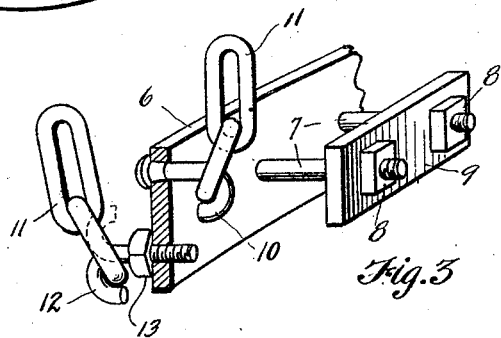
INVENTOR
JOHN JEUP
BY
Richard J. Cook
ATTORNEY Patented Dec. 8, 1925.

1,565,095

UNITED STATES PATENT OFFICE.

JOHN JEUP, OF SNOHOMISH, WASHINGTON.

ANTISKID ATTACHMENT FOR VEHICLE WHEELS.

Application filed February 9, 1924. Serial No. 691,599.

*To all whom it may concern:*

Be it known that I, JOHN JEUP, a citizen of the United States, and a resident of the city of Snohomish, county of Snohomish, State of Washington, have invented certain new and useful Improvements in Antiskid Attachments for Vehicle Wheels, of which the following is a specification.

This invention relates to improvements in anti-skid chains for motor vehicles, and more particularly to anti-skid chains for automobile trucks, stages and similar types of vehicles; it being the principal object of the invention to provide chains that can be attached to the wheels under the most difficult conditions of service.

It is a fact that it is practically impossible to attach the common types of chains used if the wheel to which they are to be applied has sunk into a soft surface and that is usually the time when chains are most desired. It is also known that the breaking of the locking device of the usual type of chain often results in the loss of the entire chain or at least renders it temporarily useless.

With these and other objectionable features in mind, it has been the object of the invention to provide anti-skid chains that can be very easily and quickly applied or removed under all conditions of service, that can be independently adjusted and which provide that in case of breakage, only the the broken section need be replaced.

More specifically stated, the invention resides in the provision of a metallic anchoring ring with means in connection therewith whereby it may be fixedly attached to the body of a wheel and whereon hooks are provided to which the opposite ends of a plurality of anti-skid chains that may be extended over the wheel tread, may be detachably secured.

Other objects of the invention reside in the details of construction and combination of parts embodied in the invention and in the manner of assembling the parts thereof for use.

In accomplishing these and other objects of the invention, I have provided the improved details of construction, the preferred forms of which are illustrated in the accompanying drawings, wherein—

Fig. 1 is a perspective view of a truck wheel equipped with anti-skid chains in accordance with the present invention.

Fig. 2 is a transverse, sectional view of the wheel rim showing the means for and method of attaching the chains.

Fig. 3 is a perspective view of a portion of the anchoring ring and hooks with chains attached thereto.

Referring more in detail to the several views of the drawings—

1 designates the tire or tread portion of a wheel which may be that of an automobile truck or similar vehicle, and which is mounted in a rim 2 on a felloe 3 supported by spokes 4 from the wheel hub 5.

Seated against the spokes on the outer side of the wheel and concentric with respect thereto, is a metal ring 6 that is clamped and held securely in place by means of a plurality of bolts 7 having ends fixed thereto and extended along opposite sides of the wheel spokes and anchored by means of nuts 8 threaded onto their outer ends to plates 9 that are seated against the outer faces of the spokes.

Fixed in the inner face of the ring 6, at suitably spaced apart intervals, are hooks 10 that have their hooked portions turned inwardly toward the center of the wheel and over these hooks the end links of anti-skid chains 11 are placed. These chains are extended about the wheel tread and to the outer side of the wheel and have their opposite end links detachably secured to the ring 6 by means of hooks 12 arranged in paired relation with the hooks on the inner side.

The hooks 12 are threaded through tne ring, as shown in Figure 3 and have lock nuts 13 thereon adapted to be tightened against the ring to hold the hooks at set positions.

With the anchor ring so constructed and secured to the wheel, when chains are to be used, the end links are first applied to the inner hooks 10 and the chains drawn about the wheel tread and the links at their opposite ends applied to the outer hooks 12. When they are to be applied to these latter hooks, the nuts 13 are first loosened and the hooked portions turned outwardly from the wheel center as is shown in dotted lines in Figure 3, then, when the end links have been seated in the hooks, the latter are turned inwardly and locked there by tightening the lock nuts against the face of the ring. To remove the chains, the above operation is reversed.

The construction above described provides for an easy and quick application or removal of the chains and makes possible their attachment under most all conditions of service. The ring may be permanently attached to the wheel and need not be removed when the chains are not in use. Adjustment of the chains may be effected by threading the hooks 12 into or from the ring.

Having thus described my invention, what I claim as new therein and desire to secure by Letters-Patent is:

1. The combination with a wheel of the class described, of a ring secured concentrically to the body of the wheel, a plurality of hooks fixed in one side of said ring with their hooked ends turned toward the center of the wheel, a plurality of hooks threaded into the ring from the other side with lock nuts thereon whereby they may be locked at different positions of adjustment and anti-skid chains extended about the tread of the wheel with their end links secured to said hooks at opposite sides of the ring.

2. An anti-skid attachment for vehicle wheels comprising an annular member and means connected therewith whereby said ring may be fixedly secured to the body of the wheel, a plurality of hooks mounted in said annular member and extended in paired relation at opposite sides thereof with all the hooks at one side of the ring fixedly mounted and turned inwardly and all hooks at the other side being rotatable and longitudinally adjustable therein, and a plurality of anti-skid chains adapted to be extended over the tread of the wheel and to be detachably applied to the hooks at the opposite sides of the ring.

Signed at Snohomish, Washington, this 31st day of December, 1923.

JOHN JEUP.